United States Patent [19]
Chorey

[11] Patent Number: 5,469,031
[45] Date of Patent: Nov. 21, 1995

[54] DYNAMIC BRAKING FOR ELECTRIC MOTORS IN A PLASTICS PROCESSING MACHINE

[75] Inventor: Edward A. Chorey, Cincinnati, Ohio

[73] Assignee: Cincinnati Milacron Inc., Cincinnati, Ohio

[21] Appl. No.: 326,971

[22] Filed: Oct. 21, 1994

[51] Int. Cl.$^6$ ....................................... H02P 3/22
[52] U.S. Cl. ............................. 318/375; 318/380
[58] Field of Search .................. 318/362, 375, 318/379, 380; 425/DIG. 13, DIG. 110, DIG. 245, DIG. 246

[56] References Cited

U.S. PATENT DOCUMENTS 3,566,227  2/1971  Edhlund .................................. 318/258
3,628,110  12/1971  Casaday ................................... 318/138
4,420,716  12/1983  Imazeki et al. ........................... 318/379
4,426,606  1/1984  Suita et al. ............................... 318/375

Primary Examiner—Bentsu Ro
Attorney, Agent, or Firm—Stephen H. Friskney

[57] ABSTRACT

A dynamic braking system for the electric motors in an injection molding machine uses the electric heater bands on the barrel of the injection unit as resistors to dissipate the energy generated by the electric motors during an emergency stop. This system includes suitable switching circuitry to disconnect the heaters from their normal power source and connect them to the motor windings for the short term dynamic braking function.

8 Claims, 3 Drawing Sheets

DYNAMIC BRAKING FOR ELECTRIC MOTORS IN A PLASTICS PROCESSING MACHINE

BACKGROUND OF THE INVENTION

1. Field of the Invention

The present invention relates to a method and apparatus for dynamic braking, and more particularly to dynamic braking for the electric motors used in the electro-mechanical drive systems of a plastics processing machine.

2. Description of the Related Art

The increasing use of electrically driven mechanisms in plastics processing machinery requires careful attention to related changes which may affect the safe operation of the machines. For example, the large horsepower motors used to power the primary systems in an injection molding machine have significant inertia in the rotor of when operating. When it is necessary to decelerate a motor and the associated load rapidly, such as an emergency stop of an operating mechanism, the motor acts like a generator and the electric energy produced by the motor must be dissipated.

Emergency braking systems for electric motors are well known in the prior art and are generally referred to as dynamic braking systems. Such systems typically use resistive dampers which are connected to the motor windings by a switch mechanism that is activated when an emergency stop is necessary. The stored energy in the motor windings is dissipated as heat by the specially provided resistors, applying a braking effect to the rotor of the motor. FIGS. 3a and 3b show a typical circuit for connection of dynamic braking resistors to an electric motor; FIG. 3a is a schematic showing the delta connection, while FIG. 3b shows a wiring diagram.

The resistors required for the dynamic braking circuit are dedicated for this single purpose and, typically, must be relatively large in physical size, even though their usage is very limited. Given the cost of these resistors and the amount of space they occupy in the electrical cabinet of a plastics processing machine, it would be advantageous, if possible, to eliminate these special resistors included solely for the dynamic braking function.

In electrically driven injection molding machines, for example, there may be as many as three or more high horsepower electric motors which all require electrical systems to provide dynamic braking, as described above. Although various dynamic braking systems are currently available for the motors used in this type of application, there has not been a system which avoids the negative aspects of size and cost associated with a dedicated resistor bank.

SUMMARY OF THE INVENTION

Accordingly, it is an object of the present invention to overcome the shortcomings of the prior art and provide a dynamic braking system specifically adapted to plastics processing machines, such as injection molding machines, which will eliminate the need for a separate, dedicated resistor bank.

The present invention accomplishes the stated objective by taking advantage of the electrical impedance of components already present in the plastics processing machine, so that they function alternately as the resistive elements needed to dissipate the energy produced during dynamic braking. In the preferred embodiment, the band heaters on the barrel of the injection unit in an injection molding machine supply the required electrical resistance. Appropriate switching circuitry is provided to interrupt the normal electrical function of the heaters and connect them to the motor windings during dynamic braking.

This system is particularly cost effective where there are multiple electric motors. For example, the present invention can be used in an electric injection molding machine to provide dynamic braking for the motors that drive mechanisms for linear axis movements in the clamp, injection and part ejection systems, and potentially for the extruder function which is rotational.

DESCRIPTION OF THE PREFERRED EMBODIMENT

Although the present invention is applicable to various plastic processing machines, the following description is presented in connection with an injection molding machine having an electro-mechanical drive system. Accordingly, a brief description of this type of machine is useful in understanding the present invention.

Figure 1:
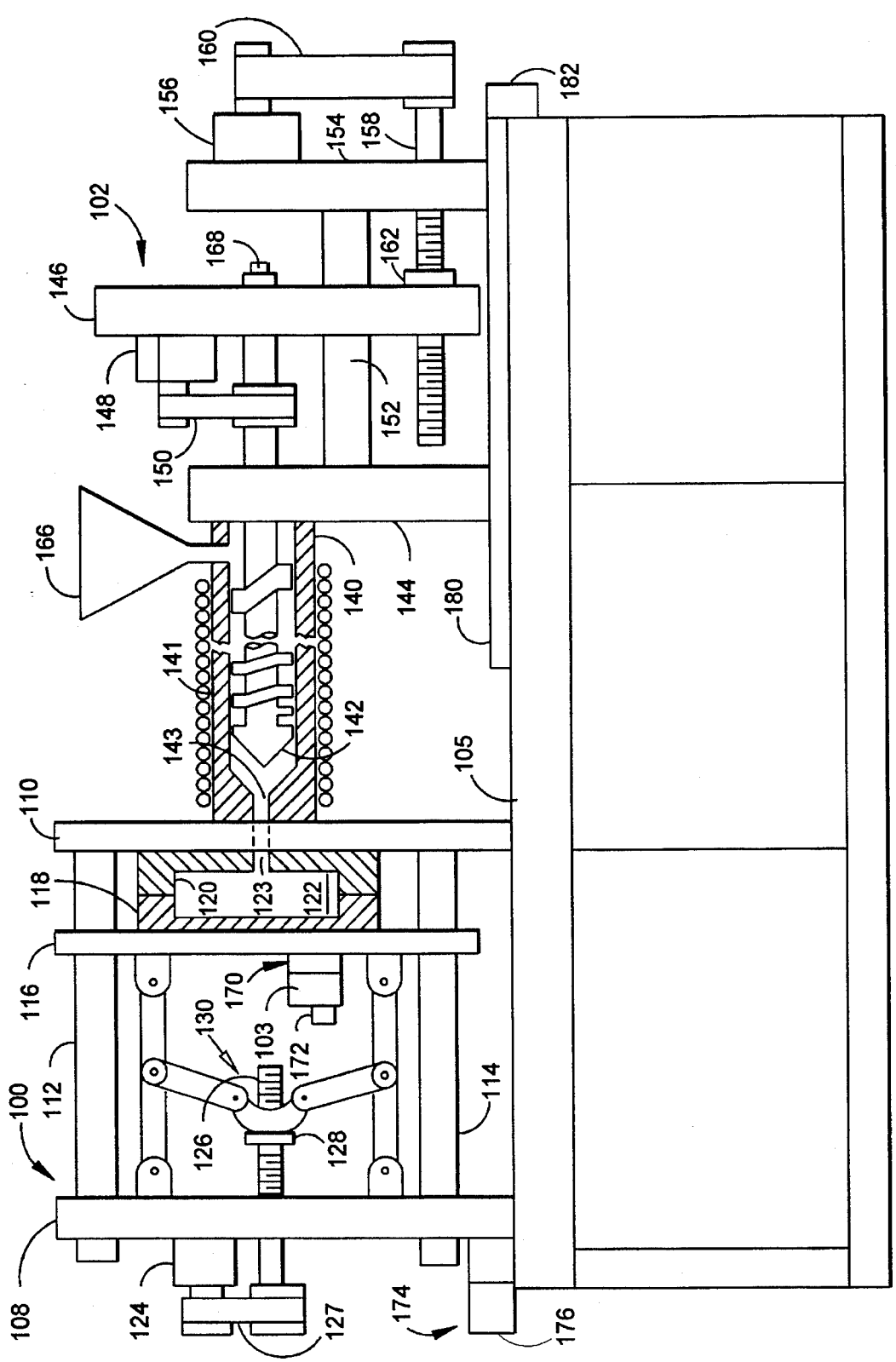
FIG. 1 is a front elevational view of an injection molding machine equipped with the dynamic braking system of the present invention.

FIG. 1 illustrates an injection molding machine to which the dynamic braking system of the present invention is applied. The machine is comprised of a clamp unit 100 and an injection unit 102, each mounted on a base 105.

The clamp unit 100 is comprised of a stationary platen 110 and a die height platen 108 which are connected by four tie bars at the platen corners. Two tie bars 112 and 114 are shown. The tie bars operate as guides for a movable platen 116. Mold halves 118 and 120 are affixed to the platens 116 and 110, respectively; and when the clamp is in the closed position shown, a mold cavity 122 is formed between the mold halves. A gate opening 123 passes through mold half 120 and stationary platen 110 to permit the injection of a plastic melt into the mold cavity 122. The moving platen 116 is operated by a clamp motor 124 mounted on the stationary platen 108. The motor 124 is connected to a ball screw 126 by a drive belt 127. A gear drive or other mechanical coupling may also be used. The ball screw nut 128 is mounted in a toggle mechanism 130 which provides a mechanical advantage for the motor 124 in operating the clamp unit 100.

The injection unit 102 includes an extruder mechanism comprised of a tubular barrel 140 having a plurality of circumferential electrical resistance heater bands 141 on the exterior surface, and an extruder screw 142 rotationally and translationally mounted therein. The screw is journalled in a stationary member 144, and one end of the screw 142 is rotatably secured in a movable member 146. Rotational motion of the screw 142 is provided by an extruder motor 148 mechanically connected to the screw by a drive belt 150; rotation may also be implemented by any other suitable mechanical device. The movable member 146 rides on a pair of parallel bar guides, one of which is shown at 152, connected between the stationary members 144 and 154. An injection motor 156 mounted on the member 154 is connected to a ball screw 158 by a drive belt 160. The ball screw nut 162 is mounted in the movable member 146; and therefore, the motor 156 is operative to provide linear motion to the member 146 and the extruder screw 142 toward or away from stationary platen 110.

An ejector unit 170 is integrated with the mold and is operative to eject the finished molded part as the mold opens. The ejector unit 170 is coupled to an ejector motor 103. The machine control (not shown) activates the motor 103 at the appropriate time in the injection molding cycle. The ejector unit 170 is preferably under servocontrol to accommodate the various requirements and operations of different molds.

A die height unit 174 is typically integrated into the tie bars and platen 108 shown in FIG. 1. The die height unit 174 provides an adjustment of the spacing of die height platen 108, including toggle mechanism 130 and movable platen 116, relative to the stationary platen 110 to accommodate different molds having different mold thicknesses when the molds are in the closed position. The die height unit 174 is controlled by a die height motor 176. The die height adjustment can be manually controlled by the operator which results in the machine control producing forward or reverse command signals to the motor 176.

The injection sled 180 generally rides on tracks (not shown) on the base 105 and supports the entire injection unit 102, thereby permitting the injection unit 102 to be moved toward or away from the stationary platen 110. The injection sled is mechanically coupled to a sled motor 182. Again, the operation of this unit can be manually controlled by the operator which results in the machine control providing forward or reverse command signals to the motor 182. It should be noted that the various motors noted above could be AC induction, brushed AC or DC, brushless (permanent magnet) AC or DC, or any other type, as might be best suited for the particular application. In fact, it is intended that the dynamic braking system of the present invention accommodate any combination of motor types, even linear motors, in order to optimize machine performance.

Figure 2:
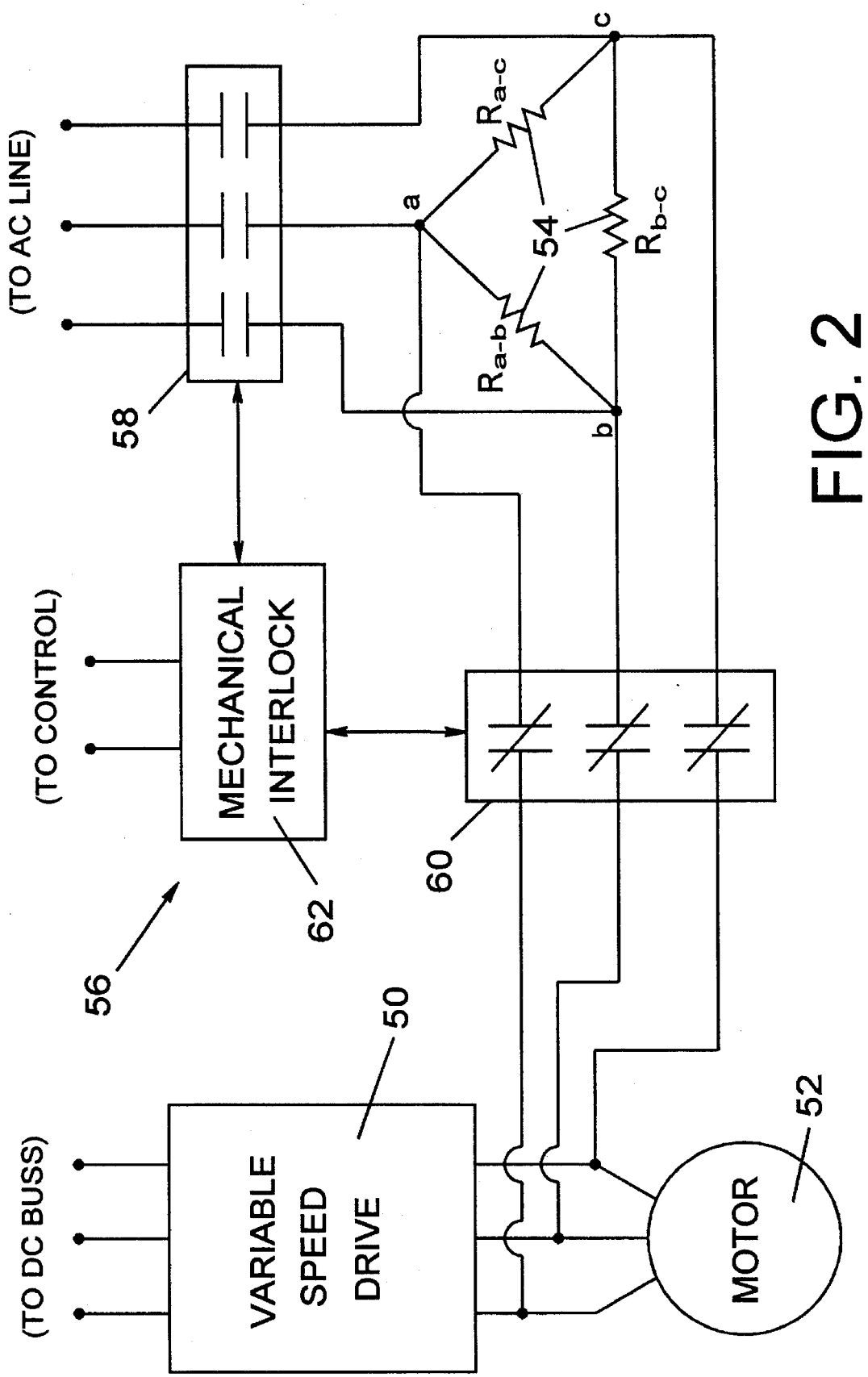
FIG. 2 is a wiring diagram for the electrical components associated with the dynamic braking system of the present invention as used in conjunction with the injection molding machine of FIG. 1.
Figure 3B:
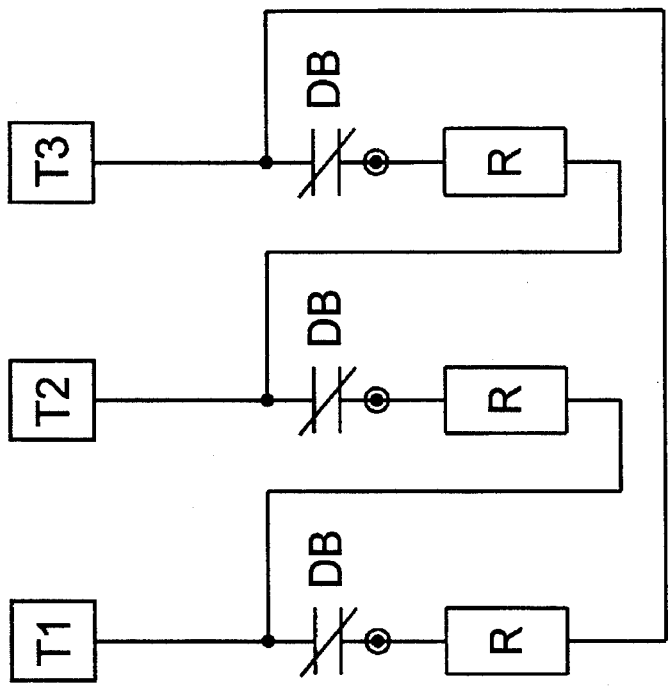
FIG. 3a and 3b are wiring diagrams for the electrical components associated with the dynamic braking system typically used in the prior art.
Figure 3A:
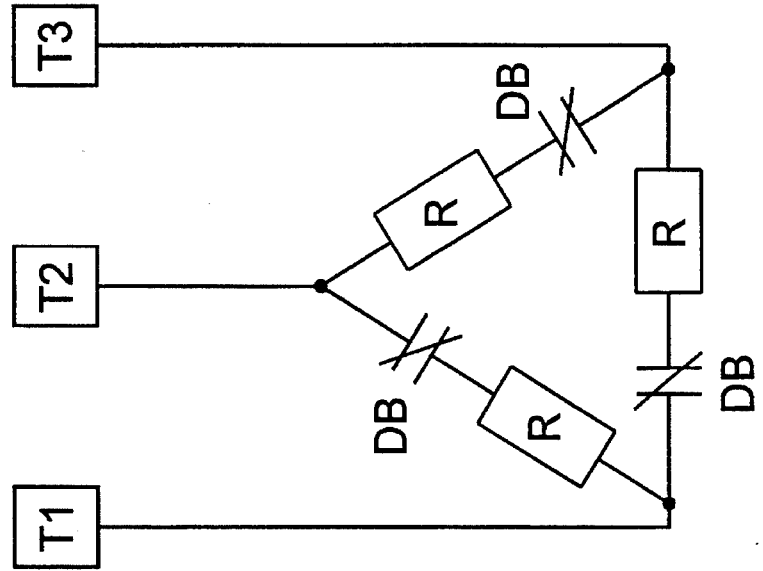

The specific elements of the electrical circuit associated with the dynamic braking system of the present invention are identified in FIG. 2. Specifically, the circuit for the dynamic braking system preferably includes a variable speed drive amplifier 50, motor 52, resistive elements 54 that primarily used for heating plastic material in the injection barrel 140, and associated wiring to complete the circuit connections. The key additional component to allow dual usage of the heater elements is the power contactor 56. The contactor 56 is unique due to the fact that it is a combination of two three pole contactors, one set of three contacts 58 being normally open and a second set of three contacts 60 being normally closed. Each set of contacts 58,60 are coupled by a common actuator and mechanical interlock 62 such that only one set of contacts can conduct electrical current (complete the circuit) at any particular point in time.

Referring again to FIGS. 1 and 2, a cycle of operation will briefly be described starting with the clamp unit 100 in the illustrated closed position. Also as illustrated, solid thermoplastic, thermoset or other material from the hopper 166 will have been plasticized by the screw 142 to form a quantity of liquid phase plastic melt or a "shot" in front of the screw. Plastication time is optimized by providing external heat to the barrel 140, typically by a plurality of circumferentially mounted heater bands 141. To initiate an injection cycle, the machine control provides a velocity command to the motor 156 in order to move linearly member 146 and screw 142 towards the platen 110. As the screw 142 moves linearly in the barrel 140 toward the stationary platen 110, the plastic melt is injected through the orifice 143 and gate opening 123 into the mold cavity 122.

When the screw 142 completes its linear motion, the machine control transfers to the pack cycle. During the injection cycle and subsequent pack and hold cycles, the extruder motor controller is provided with a zero velocity signal to keep the extruder screw 142 from rotating due to the linear forces exerted on the screw 142. In the pack cycle, the object is to continue to push the material into the mold to complete the mold filling process. At the end of a predetermined period of time, marking the end of the pack cycle, the machine control transfers to the hold cycle where pressure is maintained.

After a predetermined period marking the end of the hold cycle, the machine control transfers to a cooling cycle for a further period of time while the molded part cools. During the cooling cycle, the machine control initiates an extruder run cycle in which the extruder motor 148 is activated to extrude a new shot of molten material to the front of the screw 142. At the same time, the injection motor 156 must be operated to move the screw 142 away from the platen 110 while maintaining a predetermined pressure on the molten plastic material, i.e., a predetermined back-pressure on the extruder screw 142. The machine control causes the extruder screw motor 148 to rotate the screw to plasticize more plastic material and carry it to the front of the screw adjacent to the orifice 143. Simultaneously, the machine control may also cause the injection motor 156 to refrain to some degree from rotating in order to generate a predetermined back-pressure on the screw 142. As pressure builds up on the front of the screw, the drive control will have to supply more current to the motor 156 to maintain the zero velocity, i.e., to keep the motor from rotating. When the back pressure reaches the desired level, the motor 156 is caused to rotate, moving the screw 142 away from the platen 110 while also maintaining the predetermined back-pressure. Consequently, as the screw 142 rotates to build a shot of molten plastic, the screw will be moved away from the platen 110 with a controlled back-pressure until the full shot of plastic material is extruded.

When the screw 142 reaches a predetermined final position, the machine control stops the operation of the extruder motor 148 and issues a velocity command to the drive control for the injection motor 156 to move the screw further back, thereby relieving the pressure on the molten plastic material due to the back-pressure from the screw 142. At the end of the molded part cooling cycle, the control also provides a velocity command signal to the clamp motor 124 to shift the movable platen 116 in the direction away from the stationary platen 110 to open the mold. While the mold is opening, the control will provide command signals to the ejector unit 170 and ejector motor 103 to actuate the mold part ejector mechanism (not shown) carried by the mold half 118. The finished part is ejected from the mold, and the ejector motor 103 then returns the part ejector mechanism to its original position.

When a fully opened mold clamp position is detected, the control gives command signals to begin to moving the platen 116 in the opposite direction to again bring the mold halves together. The control will then generate velocity commands depending on the position of the platen 116 to control acceleration and deceleration and bring the mold halves into controlled contact. For example, movable platen 116 may initially be moved at a rapid rate toward stationary platen 110 to reduce overall cycle time until a predetermined position is reached. Thereafter, a command representing a low velocity is provided until another position is detected and contact of the mold halves is imminent. Under normal circumstances, the mold halves will be brought together to the fully closed position. However, if there is interference between the mold halves, a torque limit control will override the velocity control and reduce current to the motor to reduce motor velocity and motion to protect the mold halves from damage caused by the interference.

Assuming the mold halves reach the fully closed position, the torque command value is increased, and a command is given to move the toggle to a lock-over position as shown in FIG. 1. The mold clamping force is determined and controlled by the final position of the toggle mechanism 130. The machine is now ready to begin another full cycle.

Throughout the operating cycle of the injection molding machine as described above, when any of the electric motors is causing movement in a mechanical system, there is a possibility that dynamic braking will be required. Perhaps the most likely occurrence is during rapid movement of the toggle mechanism 130 to move platen 116 and open or close the mold. This movement is initiated by high speed rotation of the motor 124 which, of course, means the rotor of motor 124 has significant inertia. If an emergency stop of this mechanism is required to prevent injury to the operator, for example, dynamic braking is accomplished by the de-energization of the electrical contactor 56. As noted previously, the contactor 56 is a combination of two three pole power contactors 58,60 coupled by a mechanical interlock 62 and actuated by a single relay coil. Loss of electrical power may be caused by either the depressing of the emergency stop button, or by loss of power or signal to the control relay coil which operates the electrical contactor 56. In either case, the contacts return to their static state. More specifically, the normally open set of contacts 58 wired in series for each phase between the AC line and the barrel heater bands 141 will "open", thereby removing the supply voltage normally provided for the heater bands 141. (Note that the set of three contacts 58 are physically coupled and open simultaneously.)

Since the contacts 58,60 are mechanically coupled, concurrent with the opening of contacts 58, the normally closed set of three contacts 60 "close" to provide the electrical connection of the resistive elements 54 across the motor terminal connections. With the resistive loads now electrically connected across the motor terminals, the electrical power generated during deceleration of the motor will be dissipated as heat by the barrel heaters 141 until the motor rotation and resultant generation of electrical power ceases. When normal operation is restarted, power is applied to operate the contactor 56, closing the set of contacts 58 and simultaneously opening the contacts 60. The dynamic braking of the motors that operate any of the various drive mechanisms would be accomplished in this manner.

While the invention has been illustrated in some detail according to the preferred embodiment shown in the accompanying drawings, and while the preferred embodiment has been described in some detail, there is no intention to thus limit the invention to such detail. On contrary, it is intended to cover all modifications, alterations, and equivalents falling within the spirit and scope of the appended claims. For example, depending on the machine configuration, there may be electrical components other than heating elements that would have sufficient impedance to function satisfactorily in a dynamic braking circuit.

What is claimed is:

1. A dynamic braking system for a plastics processing machine having at least one mechanical drive system powered by an electric motor, comprising:
   (a) electrical components necessary for normal operation of the plastics processing machine, the electrical components having sufficient impedance to function alternately in a primary function during normal operation and in a secondary function as resistive elements for dynamic braking,
   (b) switching means for disconnecting the electric components from their primary function and connecting them to the windings of the electric motor for their secondary function during dynamic braking.

2. A dynamic braking system according to claim 1 wherein the electrical components include electrical resistance heating elements normally used to provide heating to a barrel of an injection unit in an injection molding machine.

3. A dynamic braking system according to claim 2 wherein the heating elements comprise a combination of resistive elements wired in a three phase delta configuration in a heater circuit and sized to provide the thermal energy necessary to melt thermoplastic material in the injection barrel.

4. A dynamic braking system according to claim 3 wherein the combination of resistive elements can be disconnected from the heater circuit and reconnected to the windings of the electric motor for the dynamic braking function.

5. A dynamic braking system according to claim 1 wherein the switching means includes a power contactor comprising
   (a) a first three pole contactor having normally open contacts,
   (b) a second three pole contactor having normally closed contacts,
   (c) means for mechanically coupling the first and second contactors such that simultaneous closure of the first and second contactors cannot occur, and
   (d) a control relay coil for common operation of both the first and second contactors.

6. A dynamic braking system according to claim 5 further comprising means for controlling the operation of the power contactor and circuit means for connecting the power contactor with the other electrical components of the dynamic braking system.

7. A dynamic braking system for an injection molding machine having an injection unit with a heated barrel and at least one mechanical drive system powered by an electric motor, comprising: (a) electrical resistance heating elements for supplying heat to the barrel of the injection unit during normal operation of the injection molding machine, the heating elements having sufficient impedance to function alternately between their primary heating function during normal operation and a secondary function as resistive elements for dynamic braking, (b) a power contactor for disconnecting the heating elements from their primary function and connecting them to the windings of the electric motor for their secondary function during dynamic braking comprising
   (i) a first three pole contactor having normally open contacts,
   (ii) a second three pole contactor having normally closed contacts, (iii) means for mechanically coupling the first and second contactors such that simultaneous closure of the first and second contactors cannot occur, and (iv) a control relay coil for common operation of both the first and second contactors.

8. In a plastics processing machine having at least one mechanical system powered by an electric motor, and further having electrical components with sufficient electrical impedance to function as resistors in a normal operation, a method for dynamic braking of the motor comprising the steps of:

(a) disconnecting the electrical components from the normal operation, (b) connecting the electronic components to the windings of the electric motor, (c) using the impedance of the electrical components to dissipate the electrical energy produced in the windings of the motor and thereby provide dynamic braking.

* * * * *